United States Patent
Rowlette (10) Patent No.: US 8,850,344 B1
(45) Date of Patent: Sep. 30, 2014

(54) DRAG DROP MULTIPLE LIST MODIFICATION USER INTERACTION

(75) Inventor: Preston R. Rowlette, Cottonwood Heights, UT (US)

(73) Assignee: Symantec Corporation, Mountain View, CA (US)

( * ) Notice: Subject to any disclaimer, the term of this patent is extended or adjusted under 35 U.S.C. 154(b) by 228 days.

(21) Appl. No.: 12/881,864

(22) Filed: Sep. 14, 2010

(51) Int. Cl.
*G06F 3/048* (2013.01)

(52) U.S. Cl.
USPC .......................................................... 715/769

(58) Field of Classification Search
USPC .......................................................... 715/769
See application file for complete search history.

(56) References Cited

U.S. PATENT DOCUMENTS

| | | | |
|---|---|---|---|
| 6,246,411 B1 * | 6/2001 | Strauss | 715/863 |
| 2005/0060653 A1 * | 3/2005 | Fukase et al. | 715/724 |
| 2005/0166159 A1 * | 7/2005 | Mondry et al. | 715/769 |
| 2006/0070007 A1 * | 3/2006 | Cummins et al. | 715/769 |
| 2006/0230334 A1 * | 10/2006 | Slawson et al. | 715/500.1 |
| 2010/0011310 A1 * | 1/2010 | Rainisto | 715/769 |

* cited by examiner

*Primary Examiner* — William Bashore
*Assistant Examiner* — Hien Duong
(74) *Attorney, Agent, or Firm* — Campbell Stephenson, LLP (57) ABSTRACT

Various systems and methods can perform a drag operation. The drag operation involves selecting an item displayed in a graphical user interface, and moving the selected item from a first location to a second location on the graphical user interface. One method involves detecting a user input and modifying the drag operation in response to the user input while the drag operation is ongoing.

14 Claims, 5 Drawing Sheets

DRAG DROP MULTIPLE LIST MODIFICATION USER INTERACTION

FIELD OF THE INVENTION

This invention relates to manipulating items accessible via a computer system, more particularly to performing drag and drop operations on items displayed by a user interface.

DESCRIPTION OF THE RELATED ART

Computer systems are useful in a wide variety of contexts to organize, access, and present information relating to large numbers of items, such as data files. Information about items is often displayed in list format and presented via a user interface. Computer systems provide various mechanisms to reorganize items, or move items from one list to another list. One way to move an item from one list to another list is known as drag and drop. In one implementation of a typical drag and drop operation, a user selects a graphical representation for an item (e.g., an icon) displayed by a graphical user interface by clicking a button on a pointing device (e.g., a computer mouse) while a displayed mouse pointer hovers over the icon, then moving the mouse while holding down the mouse button. This causes the icon to be dragged along with the displayed mouse pointer. When the icon and pointer reach a desired location in the graphical user interface, the user can release the mouse button, which drops the icon. This moves the icon from one location to another location.

The effect of dragging an icon from one location and dropping the icon in another location depends on the configuration of the computer system associated with the graphical user interface and icon. For example, a drag and drop operation can cause the item represented by the icon (e.g., a file) to be moved from a first location to a second location. Alternatively, the drag and drop operation can cause a copy of the item to be made and stored at the second location.

In certain environments, drag and drop behaviors such as those described above can result in inadequate or inefficient performance. For example, when performing a drag and drop operation between multiple lists in a traditional graphical user interface, it is impossible to efficiently modify the sources or destinations associated with the drag and drop operation.

SUMMARY OF THE INVENTION

Various systems and methods for selecting additional items during a drag operation are disclosed. For example, one method involves performing a drag operation. The drag operation involves selecting an item displayed in a graphical user interface, and moving the selected item from a first location to a second location on the graphical user interface. The method also involves detecting a user input and modifying the drag operation in response to the user input while the drag operation is ongoing. In an embodiment, the user input is a keystroke, a touchscreen contact input, or a sequence of touchscreen contact movement inputs In an embodiment, the method involves detecting the location of a pointing device. A user input device is also polled while the location of the pointing device matches predefined criteria. The method can involve displaying additional items in the graphical user interface in response to the user input.

In an embodiment, the method involves adding or removing an item to a list of items in response to detecting user input. The item can be a source item added to a list of sources. Alternatively, the item can be a destination location added to a list of destinations. In an embodiment, the method involves copying the item from the first location to a second location.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Users of a computer system generally interact with the computer system using a graphical user interface generated by one or more processors of the computer system such as a screen displayed on a monitor, and manipulated using one or more input/output devices, such as a keyboard, and one or more pointing devices, such as a mouse, pen, stylus, and the like. Using these tools a user can manipulate (e.g., open, execute, copy) various items such data files, managed computer resources, and the like. An application can allow access to a variety of items. How the application interacts with items is configured as part of the functionality of the application.

In one example of user manipulation of displayed items, a user can select an item displayed on a screen by first moving a pointing device, (e.g., a mouse) such that a displayed pointer is positioned on top of an icon that represents the item. Holding the displayed pointer over the item, also known as hovering, can select the item. In another example, a user initiates a selection input (e.g., clicks, or presses, the mouse button) while the displayed pointer is over the item in order to select the item. Once an item is selected, the user can move the item by dragging the item from one place to another. Typically this is accomplished by holding down the mouse button while the pointer is over a selected item and then moving the mouse. The item is dragged along with the pointer on the screen until the mouse button is released. When the mouse button is released, the item is dropped. The operation of dragging an item from one location to another and dropping the item is known as a drag and drop operation.

Dragging and dropping an item can have various effects, depending on the configuration of the application and computer system and the context of the drag and drop operation. For example, an icon can represent a file stored in a first directory where the first directory is represented graphically by a first list of file names and icons. Dragging an icon from the first list to a second list, has the effect, in one example, of removing the file from the first directory and placing the file in a second directory represented by the second list. In another example, the effect is to create a copy of the file and place the copy in the second directory. Of course, drag and drop operations are not limited to moving and copying files.

In some applications, it is possible to move multiple items simultaneously, or to move one or more items to multiple locations simultaneously. Consider an example in which a user is presented with two lists in a graphical user interface. The user can select multiple items to move from a first list, called a source list. Items in the source list are called source items. The user can drag and drop the source items from the first list to the second list, called a destination list. Items in the second list are called destination locations.

The user can select multiple destination locations to move an item to by selecting several items in the destination list. When a selected source item is dropped on a selected destination location, the source item is moved into the destination location. If several destination locations are selected, and the source item is dropped on one of the selected destination locations, the source item is moved into each of the selected destination locations (e.g., making multiple copies of a single item and storing the copies in multiple destinations, or providing pointers in multiple destinations to a single copy of the original item).

The user can also select multiple source items in the source list. When the user drags one of the selected source items, all selected source items are dragged as well. And when the user drops the dragged source item onto a destination location or locations, all selected source items are simultaneously dropped into the destination location(s). As can be seen, the ability to specify multiple source items and destination locations allows improvements in user efficiency in that multiple source items can be moved into multiple destination locations with only a single drag and drop operation. In computer systems where hundreds, thousands, or even millions of items and locations are involved, such user efficiency improvements can be significant.

However, prior applications do not allow a user to modify the selection of source items or destination locations once a drag and drop operation has been initiated and is ongoing. This can lead to inefficiencies and inaccuracies in performing drag and drop operations. Consider an example where a user has selected three destination locations and three source items. If the user begins dragging the selected source items to the selected destination locations, and the user wishes to select a fourth source item, or deselect one of the three destination locations. the user ends the drag and drop operation, makes the additional selection or deselection, and begins a new drag and drop operation. In order to cancel the drag and drop operation the user can drop the selected items in an area where drop is undefined, or back in their original locations, or press a key on the keyboard that signals the application to cancel the drag and drop operation. Alternatively, the user can finish the drag and drop operation and then initiate a subsequent drag and drop operation. In the example where the user wanted to deselect one of the three destination locations, if the user completed the drag and drop operation, the user can then go to the destination location the user wanted to deselect and remove the three items that were dropped in the destination location. Thus, the user performs a sequence of multiple operations to achieve the user's objective. This is one example of how the inability to modify an ongoing drag and drop operation can significantly decrease efficiency.

Figure 1:
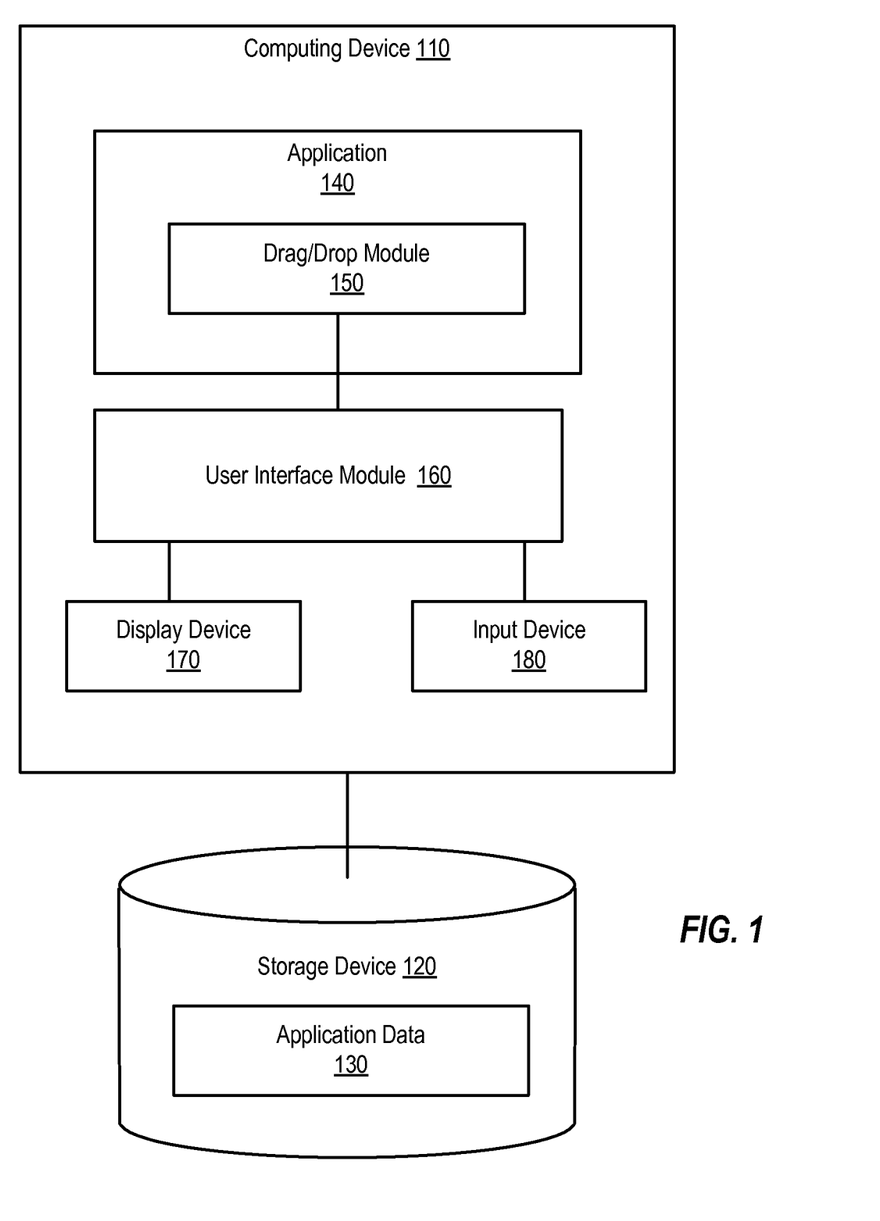
FIG. 1 is a block diagram of a system that allows modification of an ongoing drag and drop operation, according to one embodiment of the present invention.

FIG. 1 is a simplified block diagram of a system that allows modification of an ongoing drag and drop operation, according to one embodiment of the present invention. As shown, computing device 110 is coupled to storage device 120. Storage device 120 stores application data 130 that is processed by an application 140. Such data can include data files, managed computer resources, and the like. Application 140 includes drag/drop module 150 which controls the behavior of drag and drop operations performed with user interface module 160. User interface module 160 is coupled to display device 170 and input device 180. Display device 170 can include a graphical user interface to display graphical representations of data items, such as application data 130. Input device 180 can include a pointing device, such as a mouse, and a keyboard.

Computing device 110 can include, for example, a server, personal computing device, laptop computer, net book, personal digital assistant, cellular phone, or the like. Storage device 120 can include one or more of a variety of different storage devices, including hard drives, compact discs, digital versatile discs, solid state drive (SSD) memory such as Flash memory, and the like. Computing device 110 and storage device 120 can be integrated or separate. If separate, computing device 110 and storage device 120 can be coupled by a network such as the Internet or a storage area network.

Application 140 can be any of a variety of different types of software programs, including programs that act as servers (e.g., database management systems, file servers, backup servers, and the like) and programs that act as clients (e.g., email clients, web browsers, backup clients, and the like). Application 140 can alternatively be a stand-alone user-level program (e.g., a document processing application, a graphics editing program, a media player, or the like). Application 140 accesses (e.g., reads and writes) application data 130. Application 140 can access application data 130 in order to display, edit, execute, or otherwise process the data.

Drag/drop module 150 can control drag and drop operations performed via user interface module 160. Drag/drop module 150 can be included in application 140 or can be a stand-alone or add-in module. Drag/drop module 150 can detect user-initiated drag and drop operations. Drag/drop module 150 can modify ongoing drag and drop operations. In order to do so, and as discussed with regard to FIG. 3, drag/drop module 150 can monitor the position of a pointer, e.g., a pointer displayed in display device 170. In one example, display device 170 includes a graphical user interface. Drag/drop module 150 can also monitor a map of coordinates corresponding to the graphical user interface. The coordinates specify the locations of various elements of the graphical user interface, such as selectable items, unselectable items, blank space, the location of a pointer, and the like.

Drag/drop module 150 can receive such a map, e.g., from application 140, on a periodic or scheduled basis. Alternatively, drag/drop module 150 can create and maintain such a map.

When application 140 is started, user interface module 160 can cause a graphical user interface associated with display device 170 to display one or more application screens, or views. Within a view, various items, such as icons and control objects, are displayed and functionality is provided. For example, a view can include control object buttons used to access drop down menus of commands. A view can also display one or more lists of items, where the items represent application data 130, or other data objects which can be manipulated by application 140. For example, the view can display lists of files, lists of computers managed by application 140, calendar items, and the like. The lists can be stored in application data 130. In some cases, the items themselves can also be stored in application data 130. A view can display a single list of items or multiple lists of items, as well as controls used to access and display additional lists of items. When the view changes, for example as a result of user input that modifies the displayed content of the view, the map of coordinates of the view displayed in the graphical user interface is updated.

Drag/drop module 150 can monitor the location of a pointing device that has a corresponding pointer displayed in the graphical user interface. Drag/drop module 150 can assign a coordinate value to the location of the pointer. For example, when the pointer is located at the lower left corner of the graphical user interface, drag/drop module 150 can assign x and y values of zero to the pointer. If the pointer moves up the graphical user interface, drag/drop module 150 can increase the y coordinate value. If the pointer moves to the right, drag/drop module 150 can increase the x value. When the pointing device moves, the drag/drop module 150 can detect the motion and adjust the coordinates of the pointer accordingly. Drag/drop module 150 can store the coordinates in a table.

Drag/drop module 150 can also monitor the pointing device for a selection input, e.g., a click of a mouse button. Selectable items can be selected in different ways and can have different behavior when selected. For example, some items can be selected with a single click, while others can be selected with a double click. If an item has already been selected, clicking on the selected item can deselect the item. The appearance of an item can change when the item is selected. This allows a user to visually confirm the selection. For example, the selected item can change color, appear raised, or a row in a list containing the selected item can be highlighted.

The location of the pointer in the graphical user interface determines what effect, if any, a selection input has. When the pointer is in certain locations, pressing the mouse button has no effect. When the pointer is above certain items, pressing the mouse button causes some sort of action to be performed with relation to the items. Example actions are select, deselect, open, execute, and the like. Drag/drop module 150 detects the behavior of the item. This detection can be based on the type of item, the item's location, or other graphical user interface context information. For example, drag/drop module 150 can access the map of the view to determine the type of item at a given location when drag/drop module 150 detects a click while the pointer is located at the given location.

Once drag/drop module 150 detects the type of item, drag/drop module 150 can determine the appropriate action to take with respect to the given item type. For example, drag/drop module 150 can access a table that indicates that certain items can be selected as source items and certain items can be selected as destination locations. Drag/drop module 150 can track which items are selected by, for example, using lists of selected items. When an item is selected, drag/drop module 150 can add the item to a list of selected items. If the item is of a type that can be a source item, drag/drop module 150 can add the item to a list of source items. If the item is of a type that can be a destination location, drag/drop module 150 can add the item to a list of destination locations. When an item is deselected, drag/drop module 150 can remove the item from the list.

Drag/drop module 150 can create a list of selected items in response to detecting selection of an item. Alternatively, drag/drop module 150 can create a list of selected items in response to detecting initiation of a drag and drop operation. In the latter case, when an item is dragged, drag/drop module 150 can create a list of items being dragged and add the item(s) to the list. The list can contain single or multiple items. When the drag and drop operation is complete, e.g., the item(s) are dropped, drag/drop module 150 can clear the list.

Drag/drop module 150 can detect selection of items and add the selected items to the appropriate list after a drag and drop operation has begun. This allows for modifications of the lists to be made while the drag and drop operation is ongoing.

During a drag and drop operation, drag/drop module 150 can also monitor an input device, such as a keyboard, for a selection input, such as a keystroke. The result a keystroke has depends on where the pointer is in the graphical user interface and what key is pressed. A keystroke can select additional source items to be included in an ongoing drag and drop operation or select source items to remove from the ongoing drag and drop operation, while allowing the drag and drop operation to proceed. Drag/drop module 150 can add any additional selected source items to the source items list or remove any deselected source items. A keystroke can also select additional destination locations or select destination locations to be removed from the ongoing drag and drop operation, and so the destination locations list maintained by drag/drop module 150. A keystroke can also be used to scroll through a list of source items or destination locations.

After one or more source items and destination locations are selected, and a drag operation is initiated, drag/drop module 150 can detect that the mouse button is released. In response to detecting that the mouse button is released, drag/drop module 150 can initiate the drop portion of a drag and drop operation. In this portion, the items in the source items list can be copied into the locations listed in the destination location list and both lists can be cleared.

Figure 2:
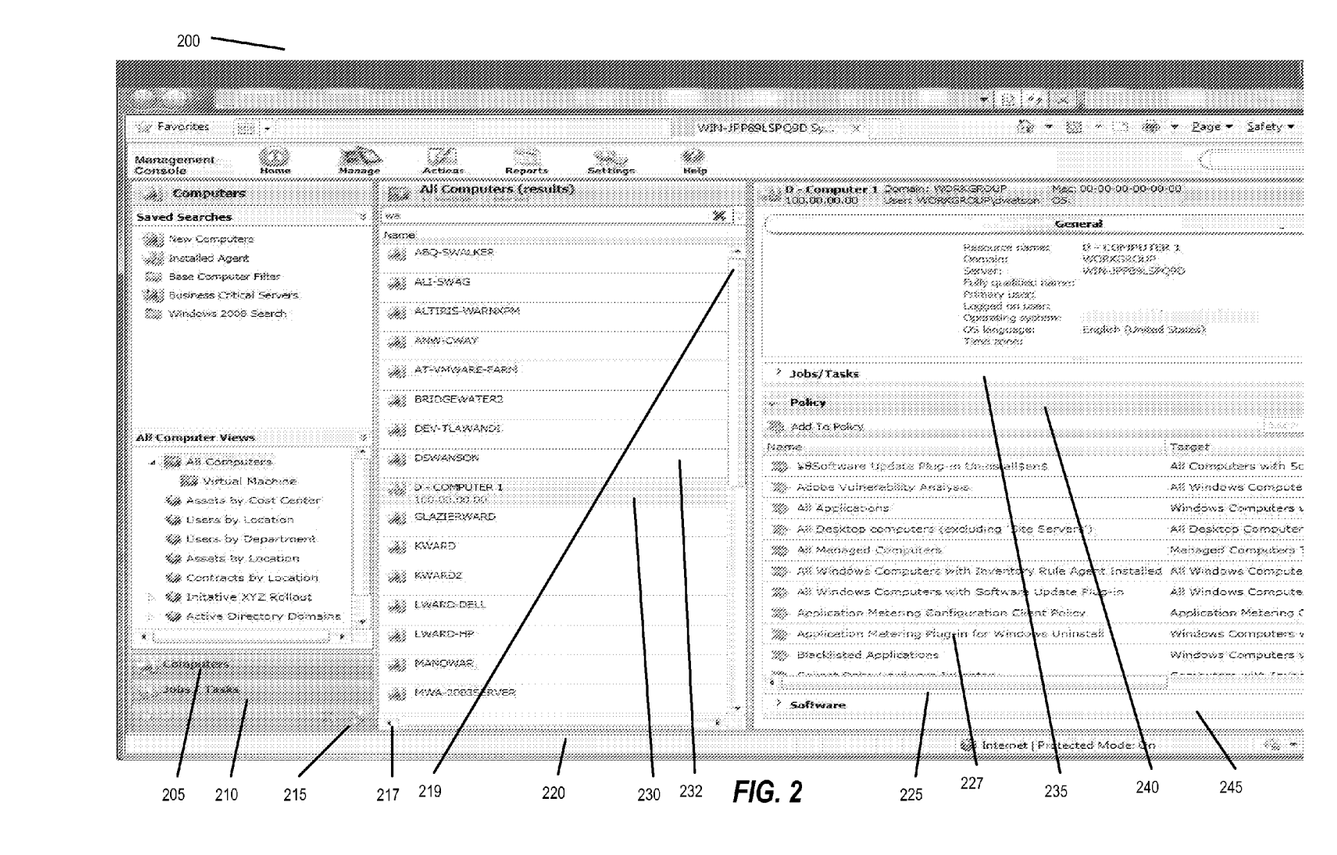
FIG. 2 is a screenshot of an application that allows modification of an ongoing drag and drop operation, according to one embodiment of the present invention.

FIG. 2 is a screenshot of an application that allows modification of an ongoing drag and drop operation, as provided by embodiments of the present invention. Application view 200 (e.g., of application 140 of FIG. 1), includes control objects 205, 210, and 215. Application view 200 also displays control elements 217 and 219. Application view 200 also includes sources list 220 and destinations list 225. Sources list 220 includes an item 230, which is illustrated as selected by a user, and item 232, which has not been selected. Destinations list 225 includes a number of destination locations, such as destination location 227. Items in a sources list (e.g. sources list 220) can be selected and moved (e.g., by performing a drag and drop operation) into a destination list (e.g., destinations list 225).

Application view 200 also includes control objects 235, 240, and 245, which can be activated to access underlying menus. Control objects 205, 210, 215, 235, 240, and 245 can be used to change the content displayed in application view

200. In FIG. 2, control object 205, labeled "Computers", has been selected by a user. In response to selection of control object 205, application view 200 displays the list of computers shown in sources list 220. The computers in sources list 220 are source items. While the source items are computers in this example, the source items could be files, directories, software programs, tasks, or any other data item or resource that can be accessed by an application that includes application view 200, such as application 140 of FIG. 1.

Application view 200 also shows that control object 240, labeled policy, has been selected (as indicated by the down caret). In response to selection of control object 240, application view 200 displays the list of policies shown in destinations list 225. The policies shown in destinations list 225 are destination locations. While the destination locations in this example are shown as policy items, the destination locations could be files, directories, software programs, tasks, or any other data item or resource that can be accessed by an application that includes application view 200, such as application 140 of FIG. 1.

Figure 3:
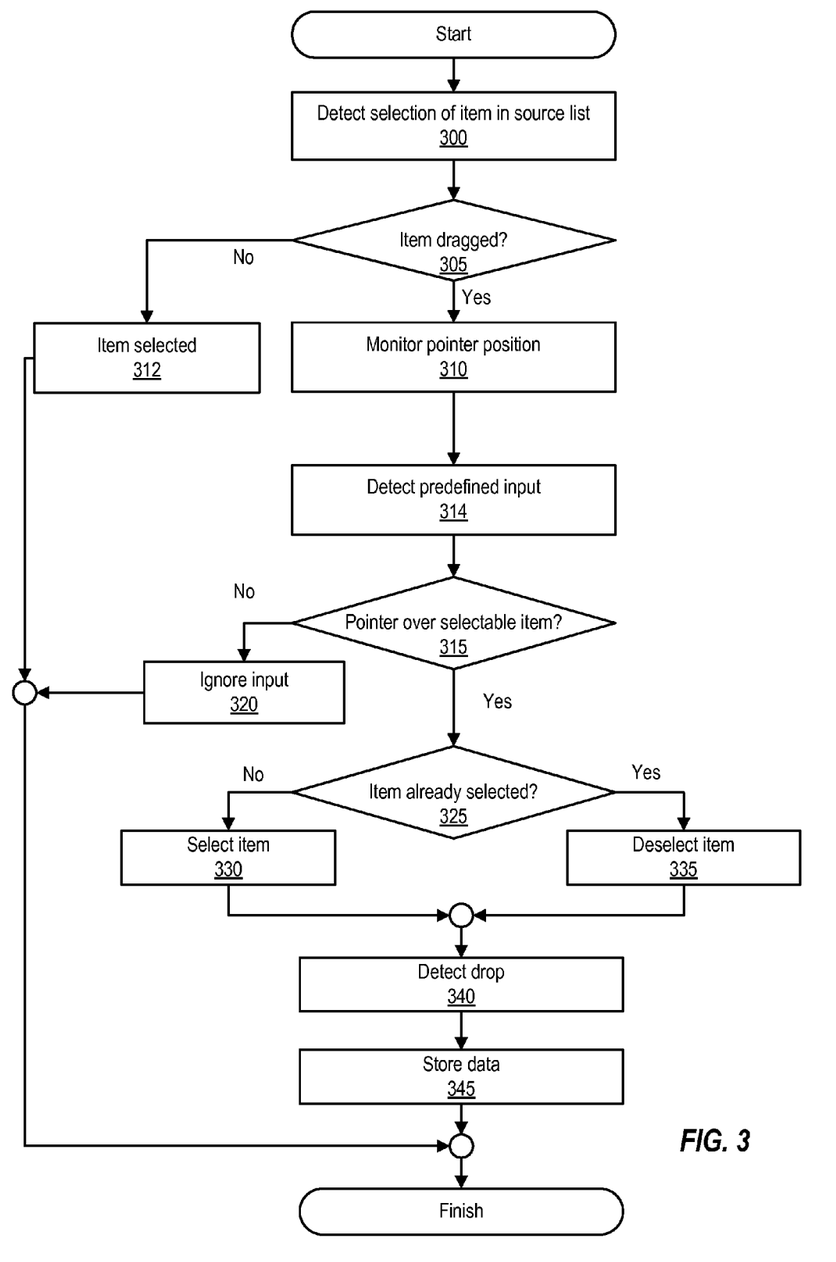
FIG. 3 is a flowchart of a method of modifying an ongoing drag and drop operation, according to embodiments of the present invention.

FIG. 3 is a flowchart of a process of modifying an ongoing drag and drop operation, according to embodiments of the present invention. In an embodiment, the process can be performed by a drag/drop module, such as drag/drop module 150 of FIG. 1, but the invention is not limited to such a configuration.

The method begins at 300, with detection of a selection of an item (e.g., item 230 of FIG. 2) in a sources list (e.g., sources list 220 of FIG. 2). Selection of an item can involve an input, such as a mouse click. The selected item can be stored in a selected sources list. Selected items can be added to the selected sources list in response to the detection of the selection of the selected items or, alternatively, can be added to the selected sources list in response to initiation of a drag and drop operation.

Destination locations (e.g., destination locations in destinations list 225 of FIG. 2) can also be selected. When selection of a destination location is detected, the selected destination locations are stored in a selected destinations list either in response to the detection of the selection or in response to detecting initiation of a drag and drop operation.

Once an item has been selected, a determination is made as to whether the item is dragged, at 305. If the item is not dragged, the item is selected at 312 and can be added to the selected sources list. When a drag and drop operation is initiated, items stored in the selected sources list are included in the drag and drop operation.

If the item is dragged, a drag and drop operation is initiated. Detecting that a mouse button is held down while the mouse is moved is one way to detect whether an item is dragged. In one example, the drag/drop module 150 of FIG. 1 can detect that a selected source item is dragged from sources list 220 of FIG. 2 to destination list 225 of FIG. 2.

At 310, while an item is being dragged, the position of a pointer is monitored. For example, as shown in FIG. 1, drag/drop module 150 can monitor the position of a pointer for a mouse included in input device 180 and displayed in a graphical user interface included in display device 170. In one example, this involves tracking the x,y coordinates of the pointer on the graphical user interface. It is understood that an x and y coordinate system is but one example of a type of coordinate system that can be implemented and other coordinate systems can be used.

Based on the pointer coordinates and a map of the view displayed by the graphical user interface, the type of area the pointer is over can be determined. When the pointer is over a selectable area, a user input can be detected at 314. For example, drag/drop module 150 can poll a keyboard included in input device 180. Alternatively, drag/drop module 150 can receive an interrupt from the keyboard. In an embodiment, a particular keystroke is specified by an administrator. For example, drag/drop module 150 can detect when the control (ctrl) key is pressed by a user. The nature of the input triggering modification of the ongoing drag and drop operation can be determined based upon the nature of the application or environment. For example, in some environments, a keyboard may be excluded and a touch screen included.

In response to detecting the predefined input, a determination is made, at 315, whether the pointer is over a selectable item. In order to make this determination, the coordinates of the pointer can be compared with the coordinate locations of selectable items in the map of the view. The term selectable items refers to all elements of a view that are responsive to user input during a drag and drop operation. This includes, in addition to source items and destination locations, control objects (e.g., control object 217 of FIG. 2) and the like.

If the input is detected while the pointer is not over a selectable item, the input is ignored at 320. If the pointer is over a selectable item when the input is detected, at 325 a determination is made whether the item is already selected. For example, drag/drop module 150 can determine if the item has been added to a selected sources list. If the item is not previously selected, the item is selected at 330. If the item is a source item, the source item is added to the selected sources list. For example, when drag/drop module 150 detects a keyboard input during a drag and drop operation when the pointer is over, for example, unselected item 232, drag/drop module 150 can select item 232 and add item 232 to the list of selected sources.

If the item is a destination location, the destination location is added to the selected destinations list. For example, when drag/drop module 150 detects a keyboard input during a drag and drop operation while the pointer is over an unselected destination location, such as unselected destination location 227, drag/drop module 150 can add the destination location to the selected destinations list.

If the item is neither source nor destination, but is a control object, or some other type of element responsive to input during a drag and drop operation, the function associated with the element is performed. For example, drag/drop module 150 can scroll through a list in response to a keystroke that occurs during a drag and drop operation while the pointer is over a view element that controls scrolling, such as control object 217.

When input is detected during a drag and drop operation while the pointer is over a control object, the view displayed in the graphical user interface can be revised. For example, if the drag/drop module detects a keyboard input while the drag and drop operation is ongoing and the pointer is over the software control object 215 icon (shown as a picture of a CD-ROM), the view can be changed to show a new sources list in response to the software control object 215, being selected. In response to changing the view, the drag/drop module can receive or generate a map that reflects the coordinates of the items, selectable areas, and non-selectable areas displayed in the revised view. The drag/drop module can then detect selection or deselection of one or more of the source items in the software source list and add the item to the selected source list, or remove the item from the selected source list, depending on whether the item was already included in the selected source list.

If the input is detected while the pointer is over an item that is already selected, the item is deselected at 335. In the case of a source item, this involves removing the source item from the selected source items list. In the case of a destination location, this involves removing the destination location from the selected destination locations list. For example, when drag/drop module 150 detects a keyboard input during a drag and drop operation when the pointer is over, for example, selected item 230, drag/drop module 150 can deselect item 230 and remove item 230 from the list of selected sources. Similarly, when drag/drop module 150 detects a keyboard input during a drag and drop operation while the pointer is over a selected destination location, drag/drop module 150 can remove the destination location from the selected destinations list.

At 340, a drop is detected. In one example, this involves detecting that the mouse button is released. Detecting a drop also involves determining the location of the pointer. At 345, if the pointer is over a selected destination location, the item(s) from the sources list are stored in the locations specified by the destinations list.

Note that the listed inputs are provided by way of example. A variety of user inputs can be provided using different input devices. Further, the responses to those inputs can vary depending on the nature of the application. In all instances, however, embodiments of the present invention provide for inputs to be accepted during the course of a drag and drop operation.

Figure 4:
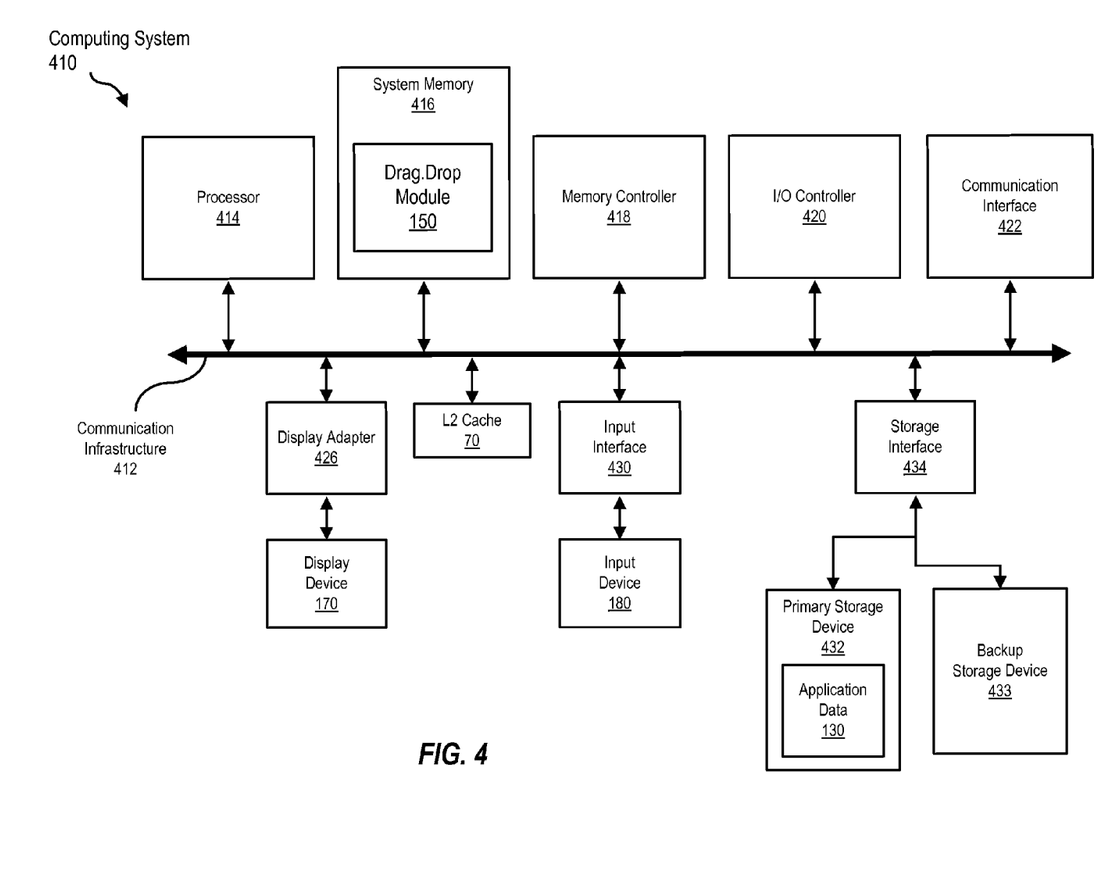
FIG. 4 is a block diagram of a computing device, illustrating how a drag/drop module can be implemented in software, according to one embodiment of the present invention.

FIG. 4 is a block diagram of a computing system 410 capable of implementing an drag/drop module as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements drag/drop module 150, computing system 410 becomes a special purpose computing device that is configured to provide improved performance of drag and drop operations.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing all or some of the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432 and/or L2 cache 70, as described in detail below In certain embodiments, computing system 410 may also include one or more components or elements in addition to processor 414 and system memory 416. For example, as illustrated in FIG. 4, computing system 410 may include an L2 cache 70 (e.g., an SSD memory device), a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 170 coupled to communication infrastructure 412 via a display adapter 426. Display device 170 generally represents any type or form of device capable of visually displaying information forwarded by display adapter 426, such as one or more views of a graphical user interface. Similarly, display adapter 426 generally represents any type or form of device configured to forward graphics, text, and other data from communication infrastructure 412 (or from a frame buffer, as known in the art) for display on display device 170.

As illustrated in FIG. 4, computing system 410 may also include at least one input device 180 coupled to communication infrastructure 412 via an input interface 430. Input device 180 generally represents any type or form of input device capable of providing input, either computer or human generated, to computing system 410. Examples of input device 180 include, without limitation, a keyboard, a pointing device, such as a mouse, pen, or stylus, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may each include a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can store information such as application data 130, as described above.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium. Non-transitory computer-readable media include forms of computer-readable memory excluding a transitory, propagating signal.

The non-transitory computer-readable medium containing the computer program may be loaded into computing system 410. All or a portion of the computer program stored on the non-transitory computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

Figure 5:
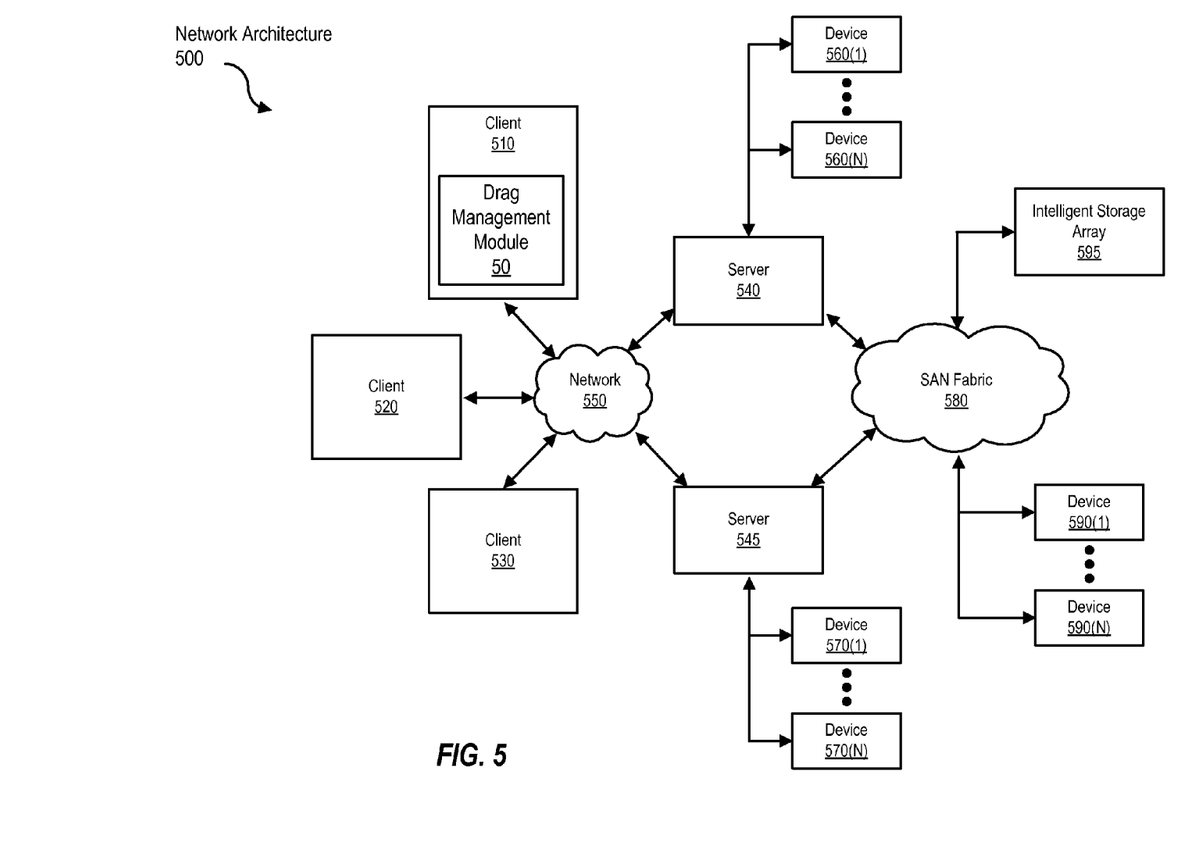
FIG. 5 is a block diagram of a networked system, illustrating how various computing devices can communicate via a network, according to one embodiment of the present invention.

FIG. 5 is a block diagram of a network architecture 500 in which client systems 510, 520, and 530 and servers 540 and 545 may be coupled to a network 550. Client systems 510, 520, and 530 generally represent any type or form of computing device or system, such as computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include a drag/drop module 150 as shown in FIGS. 1 and 4.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS).

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of the computing devices in FIGS. 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a drag/drop module 150 in FIG. 1 may transform application data by controlling which application data is included in various locations in a computing device, such as the computing devices in FIGS. 4 and 5.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
performing a drag operation, wherein the drag operation comprises
selecting at least one source item of a set of source items displayed in a graphical user interface, and
selecting a plurality of destination locations of a set of destination locations displayed in the graphical user interface;
initiating a move of the at least one source item from at least one source location to the plurality of destination locations on the graphical user interface subsequent to the selecting the at least one source item and the selecting the plurality of destination locations;
detecting a user input subsequent to the initiating the move;
generating a list of selected destination locations, wherein the list of selected destination locations comprises information identifying the plurality of destination locations; and
modifying the drag operation in response to the user input, wherein
the modifying comprises
removing a subset of destination locations from the list of selected destination locations in response to the detecting the user input, wherein the subset comprises fewer items than the plurality of destination locations, and
the removing is performed subsequent to the initiating the move.

2. The method of claim 1 further comprising:
detecting the location of a pointing device;
polling a user input device while the location matches a predefined criteria.

3. The method of claim 1 further comprising:
generating a selected sources list in response to the selecting the at least one source item, wherein
the selected sources list comprises information identifying the at least one source item.

4. The method of claim 1 further comprising:
copying the at least one source item to the plurality of destination locations.

5. The method of claim 1, wherein
the user input comprises one or more of keystroke, a touchscreen contact input, or a sequence of touchscreen contact movement inputs.

6. The method of claim 1, further comprising:
adding an additional source item to the at least one source item in response to a second user input; and
displaying the additional source item in the graphical user interface in response to the second user input.

7. A non-transitory computer readable storage medium comprising program instructions executable to:
perform a drag operation, wherein the drag operation comprises
selecting at least one source item of a set of source items displayed in a graphical user interface, and
selecting a plurality of destination locations of a set of destination locations displayed in the graphical user interface;
initiating a move of the at least one source item from at least one source location to the plurality of destination locations on the graphical user interface subsequent to the selecting the at least one source item and the selecting the plurality of destination locations;
detect a user input subsequent to the initiating the move; and
generating a list of selected destination locations, wherein the list of selected destination locations comprises information identifying the plurality of destination locations;
modify the drag operation in response to the user input, wherein
modifying the drag operation comprises
removing a subset of destination locations from the list of selected destination locations in response to the detecting the user input, wherein the subset comprises fewer items than the plurality of destination locations, and
the removing is performed subsequent to the initiating the move.

8. The non-transitory computer readable storage medium of claim 7, wherein the program instructions are further executable to:
   detect the location of a pointing device; and
   poll a user input device while the location matches a predefined criteria.

9. The non-transitory computer readable storage medium of claim 7, wherein the program instructions are further executable to:
   generate a selected sources list in response to the selecting the at least one source item, wherein
      the selected sources list comprises information identifying the at least one source item.

10. The non-transitory computer readable storage medium of claim 7, wherein the program instructions are further executable to:
   copy the at least one source item to the plurality of destination locations.

11. The non-transitory computer readable storage medium of claim 7, wherein the program instructions are further executable to:
   add an additional source item to the at least one source item in response to a second user input; and
   display the additional source item in the graphical user interface in response to the user input.

12. A system comprising:
   one or more processors; and
   memory coupled to the one or more processors, wherein the memory stores program instructions executable by the one or more processors to:
      perform a drag operation, wherein the drag operation comprises
         selecting at least one source item of a set of source items displayed in a graphical user interface, and
         selecting a plurality of destination locations of a set of destination locations displayed in the graphical user interface;
      initiating a move of the at least one source item from at least one source location to the plurality of destination locations on the graphical user interface subsequent to the selecting the at least one source item and the selecting the plurality of destination locations;
      detect a user input subsequent to the initiating the move; and
      generate a list of selected destination locations, wherein the list of selected destination locations comprises information identifying the plurality of destination locations;
      modify the drag operation in response to the user input, wherein
         modifying the drag operation comprises
            removing a subset of destination locations from the list of selected destination locations in response to the detecting the user input, wherein the subset comprises fewer items than the plurality of destination locations, and
            the removing is performed subsequent to the initiating the move.

13. The system of claim 12, wherein the program instructions are further executable to:
   detect the location of a pointing device; and
   poll a user input device while the location matches a predefined criteria.

14. The system of claim 12, wherein the program instructions are further executable to:
   generate a selected sources list in response to the selecting the at least one source item, wherein
      the selected sources list comprises information identifying the at least one source item.

* * * * *